Patented Apr. 14, 1953

2,635,081

UNITED STATES PATENT OFFICE 2,635,081

MOLYBDENUM DISULFIDE ON A SPENT CRACKING CATALYST

Ivor W. Mills, Glenolden, and Herbert L. Johnson, Media, Pa., assignors to Sun Oil Company, Philadelphia, Pa., a corporation of New Jersey No Drawing. Application December 13, 1950, Serial No. 200,700

5 Claims. (Cl. 252—439)

This invention relates to the hydrogenation of carbonaceous materials. More particularly, this invention relates to a novel catalyst especially suitable for the hydrogenation of hydrocarbon oils.

Various materials, including molybdenum disulfide, either used alone or deposited on a carrier, have been described as suitable for catalyzing processes for the hydrogenation of carbonaceous materials such as unsaturated hydrocarbons. Most of these heretofore described materials, however, are not suitable in commercial installations since they suffer from one or more of the following or other difficulties: the catalyst is not sufficiently effective to achieve the desired degree of hydrogenation, the catalyst lacks mechanical strength, or is expensive to prepare and regenerate.

It has now been discovered that molybdenum disulfide deposited on a spent cracking catalyst is a remarkably effective catalyst for the hydrogenation of carbonaceous materials.

By the expression "spent cracking catalyst," as used herein, is meant those catalysts which are effective for cracking hydrocarbons, especially hydrocarbons boiling above the gasoline range, and which by virtue of use in such cracking operation exhibit a decreased activity toward such cracking, such decreased activity being a reduction of about 30% to 50% below the initial activity and being caused at least in part by the deposition of foreign materials on the catalyst which are not removed in the usual regenerative processes for reactivating cracking catalysts. "Catalytic activity," as used herein, is a measure of the efficacy of a catalyst for cracking hydrocarbons, and is determined by a method described by Alexander, Proceedings Am. Pet. Inst. 27 (III) 51 (November 1947).

As illustrative of cracking catalysts which suffer deactivation in cracking processes to form a spent catalyst which may be employed to prepare the hydrogenation catalyst of the present invention may be mentioned absorbents such as activated clays and bauxite; synthetic catalysts containing silica, such as silica-alumina, silica-magnesia, and silica-zirconia compositions; and natural minerals such as zeolites and feldspar which may be specially treated prior to use in cracking such as by leaching with mineral acids. In accordance with the present invention, it is preferred to employ a cracking catalyst of siliceous nature, and more preferably to employ a catalyst composed of silica and alumina, which has become spent in a catalytic cracking operation, and for simplicity the present invention is described with reference to this spent cracking catalyst, it being understood that other spent cracking catalysts may be employed and good results obtained therewith.

The use of silica-alumina catalysts for the cracking of hydrocarbons is well-known. Such catalysts generally contain a ratio of silica to alumina of 1:1 to 15:1 and preferably from 70% to 80% silica, from 20% to 10% alumina, and not more than 10% of other metallic oxides. It is also essential that water be present preferably in a quantity of about 2%. Good results are obtained in cracking where the catalyst is prepared by impregnating silica with alumina salts, by directly combining precipitated hydrated alumina and silica, or by joint precipitation of alumina and silica from aqueous solutions of their salts, and by washing, drying, and heating the so-obtained compositions to approximately 1,000° F. In cracking operations, which are commonly conducted at temperatures of from about 750° F. to 950° F. and pressures of from about 25 p. s. i. to 200 p. s. i., the catalytic activity of the catalyst progressively decreases due to the accumulation of coke and other foreign materials thereon until its use in the operation is no longer feasible. Such spent catalysts may be regenerated by burning off the deposited coke by heating to a temperature usually less than about 1,100 to 1,200° F. in a stream of air which may be diluted with an inert gas in order to control the rate of burning. Regenerative processes, however, do not completely restore to the catalyst its initial activity, and regeneration becomes progressively less effective. This effect is due at least in part to the deposition of foreign materials on the catalyst which are not removed in the regeneration process. When the cracking activity, after regeneration, of a catalyst has decreased to from about 70% to 50% of its initial activity, regeneration thereof is no longer feasible and the catalyst is discarded.

An object of the present invention is to provide a new catalytic composition which is especially effective for the hydrogenation of carbonaceous materials. Another object is to provide an effective hydrogenation catalyst from a spent cracking catalyst. A further object is to provide a process for the hydrogenation of unsaturated hydrocarbons using a catalyst prepared from a spent cracking catalyst. Other objects appear hereinafter.

In accordance with the present invention, a hydrogenation catalyst is prepared by depositing molybdenum disulfide on a cracking catalyst, preferably consisting of silica and alumina, which has been employed for the catalytic cracking of hydrocarbons until the activity thereof in the cracking operation has decreased at least about 30% below its initial activity so that regeneration for further use in cracking is not feasible. Molybdenum disulfide is deposited on this spent cracking catalyst. This is advantageously accomplished by impregnating the spent catalyst with an aqueous solution of ammonium molybdate, treating the impregnated cracking catalyst with hydrogen sulfide, and heating the so-treated composition in an atmosphere of hydrogen. The finished hydrogenation catalyst should contain from 10% to 25% by weight of molybdenum disulfide. The final compositions thus comprise silica and alumina in the ratio of silica:alumina of from 1:1 to 15:1 and contain deposited thereon from 10% to 25% by weight of molybdenum disulfide, and minor amounts of impurities which were deposited on the silica-alumina catalyst in the cracking operation including titanium, vanadium, iron, chromium, and nickel. The effectiveness of the present catalytic composition is especially surprising since it is generally believed that cracking catalysts and compositions containing cracking catalysts are highly unsuitable for use in hydrogenation processes, and the reason a spent silica-alumina cracking catalyst containing molybdenum disulfide deposited thereon is remarkably effective for the hydrogenation of unsaturated carbonaceous materials is not known with certainty. While it is not desired to be limited by theoretical considerations, it is believed that the efficacy of the present hydrogenation catalyst is substantially due to the presence of the minor quantities of impurities, especially metallic impurities, imparted to the silica-alumina cracking catalyst in the cracking operation, and possibly to surface effects caused by subjecting the catalyst to cracking conditions.

The catalysts of the present invention are especially suitable for the hydrogenation of the aromatic constituents of petroleum fractions. For example, the properties of lubricating oil containing aromatic hydrocarbons may be improved by hydrogenating in accordance with the present invention. It is especially advantageous to hydrogenate one-pass gas oil to improve the crackability thereof. For example, hydrogenation of a one-pass gas oil having a boiling point of from about 400° to 700° F. and containing from 30% to 50% aromatic hydrocarbons, principally polynuclear aromatics such as naphthalenes, to convert a portion thereof to tetralins and decalins, and subsequent cracking results in an increase in the gasoline yield and a decrease in coke formation. Other unsaturated hydrocarbons, such as olefins and acetylenes, and hydrocarbon mixtures containing such unsaturated hydrocarbons, may advantageously be hydrogenated in the presence of the present catalyst.

The catalysts of the present invention are effective for the hydrogenation of aromatic hydrocarbons, such as naphthalenes, under relatively mild conditions, the optimum conditions for a given application being dependent upon the charge stock, the degree of hydrogenation desired, and the like. In general, using the present catalysts, hydrogenation is advantageously obtained by using a hydrogen pressure of from 500 to 1,800 p. s. i. and a temperature of from 250° C. to 350° C. Higher temperatures and pressures can be used, so long as the variables are maintained within hydrogenating conditions.

In order to demonstrate the effectiveness of the catalyst and the process of the present invention, a spent silica-alumina cracking catalyst was coated with 21.4% molybdenum disulfide. The spent cracking catalyst consisted of about 75% silica and about 25% alumina and had been employed for about 6 months in a commercial installation involving the catalytic cracking of a gas oil. During the period of cracking the catalyst had been subjected to about 10,000 regenerations and the initial activity of 45 decreased so that regeneration restored an activity of 29, i. e. the catalytic activity decreased by 35.6%. Catalytic activity was measured by the method cited above. An analysis of the spent catalyst showed the presence of minor amounts of various metals including at least about 0.1% to 1% of titanium, vanadium and iron, and at least about 0.001% to 0.1% chromium, and at least about 0.01% to 1% nickel. This spent catalyst was impregnated with an aqueous solution of ammonium molybdate. Water was expelled by gentle heating and the resulting mass treated with hydrogen sulfide to convert the ammonium compounds to ammonium thiomolybdate. The composition was then heated to 300° C. in an atmosphere of hydrogen to convert the thiomolybdate to the disulfide. The final composition contained 21.4% molybdenum disulfide.

This catalyst was used to hydrogenate one-pass catalytic gas oil having a refractive index $n_D^{20}=1.4940$, a density $d_4^{20}=0.8723$ and containing by weight 65% saturates, 32% naphthalenes, and 3% tetralins and boiling between 439° F. and 654° F. In saturating aromatic bonds, e. g. in hydrogenating naphthalene to tetralin and decalin, the refractive index of the hydrocarbon mixture is decreased and this decrease in refractive index constitutes a measure of the degree of hydrogenation. Operating conditions were 1,500 p. s. i. at a temperature of 340° C. at a space rate (liquid hourly space velocity) of 1. An increase in the refractive index $(n_D^{20} \times 10^4)$ of 181 was observed, thus indicating a substantial amount of hydrogenation wherein naphthalenes were converted to tetralins, the product consisting of, by weight, naphthalenes about 5%, tetralins about 20%, and decalins about 10%, the remainder being saturates.

For comparative purposes the above procedure was duplicated except that a fresh alumina-silica cracking catalyst was employed. In this process the refractive index change of only 158 was observed thus demonstrating that this catalyst is much less effective in hydrogenation processes than molybdenum disulfide deposited on a spent cracking catalyst.

In the above example, the molybdenum disulfide-spent cracking catalyst showed excellent mechanical strength, no disintegration being observed. The present invention thus provides a catalyst exceptionally effective in hydrogenation process, which possesses excellent mechanical strength, and which is inexpensive, being prepared from a material which has heretofore been discarded.

The present catalyst may be regenerated by methods known to the art for the regeneration of molybdenum disulfide catalysts. A particularly advantageous method of regeneration which may be employed is described in copending application Serial No. 173,694, filed July 13, 1950, in which process the spent hydrogenation catalyst is heated in the presence of oxygen, treated with ammonium hydroxide followed by treatment with hydrogen sulfide, and is then heated in the presence of a reducing gas.

The invention claimed is:

1. An improved hydrogenation catalyst consisting essentially of a spent cracking catalyst containing deposited thereon 10% to 25% molybdenum disulfide, said spent cracking catalyst comprising a cracking catalyst previously utilized as the catalyst in a process for cracking hydrocarbons until its cracking activity was spent to an extent of at least 30% of its initial cracking activity.

2. An improved hydrogenation catalyst consisting essentially of a spent cracking catalyst containing deposited thereon from 10% to 25% molybdenum disulfide, said spent cracking catalyst comprising a silica-alumina composition previously utilized as the catalyst in a process for cracking hydrocarbons until its cracking activity was spent to an extent of at least 30% of its initial cracking activity.

3. An improved hydrogenation catalyst consisting essentially of a spent cracking catalyst containing deposited thereon 10% to 25% molybdenum disulfide, said spent cracking catalyst comprising a silica-magnesia composition previously utilized as the catalyst in a process for cracking hydrocarbons until its cracking activity was spent to an extent of at least 30% of its initial cracking activity.

4. An improved hydrogenation catalyst consisting essentially of a spent cracking catalyst containing deposited thereon from 10% to 25% molybdenum disulfide, said spent cracking catalyst comprising a silica-zirconia composition previously utilized as the catalyst in a process for cracking hydrocarbons until its cracking activity was spent to an extent of at least 30% of its initial cracking activity.

5. An improved hydrogenation catalyst consisting essentially of a spent cracking catalyst containing deposited thereon from 10% to 25% molybdenum disulfide, said spent cracking catalyst comprising a spent natural mineral cracking catalyst composition previously utilized as the catalyst in a process for cracking hydrocarbons until its cracking activity was spent to an extent of at least 30% of its initial cracking activity.

IVOR W. MILLS.
HERBERT L. JOHNSON.

References Cited in the file of this patent

UNITED STATES PATENTS

| Number | Name | Date |
|---|---|---|
| 2,094,128 | Lazier et al. | Sept. 28, 1937 |
| 2,106,735 | Gwynn | Feb. 1, 1938 |
| 2,110,833 | Mark et al. | Mar. 8, 1938 |
| 2,192,125 | Brown et al. | Feb. 27, 1940 |
| 2,238,594 | Malishev | Apr. 15, 1941 |
| 2,310,278 | Connolly | Feb. 9, 1943 |
| 2,399,927 | Howes et al. | May 7, 1946 |
| 2,402,683 | Signiago | June 25, 1946 |
| 2,550,531 | Ciapetta | Apr. 24, 1951 |